United States Patent [19]

Takeuchi et al.

[11] Patent Number: 4,805,048

[45] Date of Patent: Feb. 14, 1989

[54] METHOD FOR CONTROLLING TO KEEP OFF DEFECTS ON MAGNETIC DISKS

[75] Inventors: Hisaharu Takeuchi; Hisashi Takamatsu; Masahiro Nakayama; Yoshiro Shiroyanagi; Akira Kurano, all of Odawara, Japan

[73] Assignee: Hitachi, Ltd., Tokyo, Japan

[21] Appl. No.: 116,346

[22] Filed: Nov. 4, 1987

[30] Foreign Application Priority Data

Nov. 10, 1986 [JP] Japan .............................. 61-265485

[51] Int. Cl.$^4$ ..................... G11B 5/02; G11B 17/02
[52] U.S. Cl. ...................................... 360/69; 360/27; 360/60
[58] Field of Search ................. 360/69, 31, 38, 49, 360/60, 27

[56] References Cited

U.S. PATENT DOCUMENTS

| | | | |
|---|---|---|---|
| 3,689,891 | 9/1972 | Kril | 340/172.5 |
| 4,420,807 | 12/1983 | Nolta et al. | 364/200 |
| 4,507,693 | 3/1985 | Matsuda et al. | 360/72.2 |
| 4,545,044 | 10/1985 | Satoh et al. | 369/32 |
| 4,558,446 | 12/1985 | Banba et al. | 360/47 |
| 4,631,723 | 12/1986 | Rathbun et al. | 360/47 |

FOREIGN PATENT DOCUMENTS 49-52612  5/1974  Japan .

Primary Examiner—Robert S. Tupper
Attorney, Agent, or Firm—Antonelli, Terry & Wands

[57] ABSTRACT

A method for controlling to keep off defects in a magnetic disk apparatus while has a plurality of magnetic disks and defect position information is recorded in each of tracks on each magnetic disk to keep off a defect in writing records in each track. Positional information about defects on all the tracks belonging to a cylinder of the magnetic disk apparatus is recorded in each of the tracks, and records are written in each of the tracks while keeping off the defects on the basis of the recorded positional information about the defects.

1 Claim, 4 Drawing Sheets

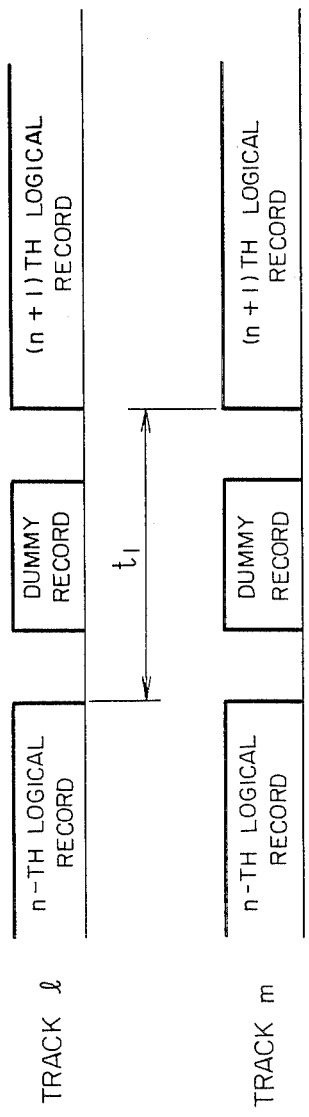
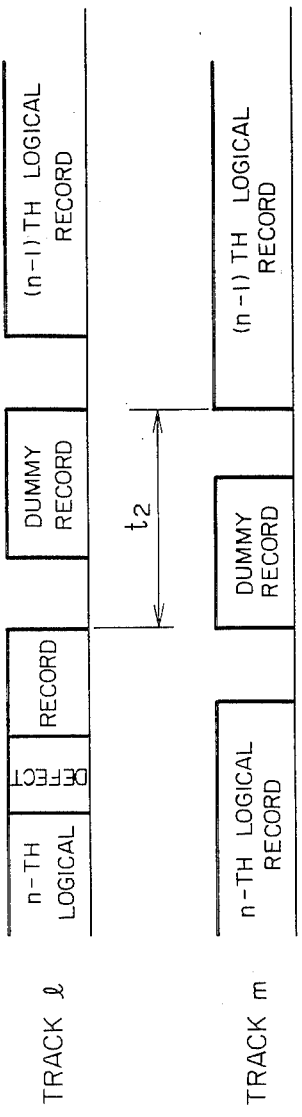
FIG. 1a (PRIOR ART)
FIG. 1b (PRIOR ART)

METHOD FOR CONTROLLING TO KEEP OFF DEFECTS ON MAGNETIC DISKS

BACKGROUND OF THE INVENTION

The present invention relates to a method for controlling to keep off defects on magnetic disks, and more particularly to a record-arrangement control method for keeping off defects on magnetic disks which method is used to access a plurality of tracks with the aid of a channel program made up of a plurality of channel command words, and to write data in or read data out of the tracks at high speed in spite of defects on the tracks, thereby increasing the throughput of a data processor.

In a conventional magnetic disk apparatus, as described in, for example, a Japanese patent application Japanese Patent Unexamined Publication No. 49-52,612, the first area of each of tracks on a magnetic disk usually contains the positional information about defects on the track, and records are arranged on the track so that area of the track which contains a defect and has a predetermined length, is left unused, that is, the records are arranged so as to keep off the defect.

A disk access method has been known, in which one of a plurality of tracks are changed over to another track by a channel program made up of a plurality of channel command words to access the tracks efficiently. In this method, a dummy record corresponding to a changeover time (namely, a time necessary for changing a track over to another track) is provided on each track, and a track is changed over to another track at the dummy record. However, the dummy record contains no information, and hence is a useless area. Accordingly, it is desirable to make the length of the dummy record as short as possible. Thus, the length of the dummy record is made accurately correspond to the changeover time, that is, has no margin.

In a case where each of tracks belonging to a cylinder has no defect and all of the tracks have the same record arrangement, when the access to a record on one of the tracks has been completed, the next record on another track can be smoothly accessed by a track changeover operation, because the record on one track is spaced apart from the next record on another track by a distance corresponding to the changeover time in the circumferential direction of one track. However, in a case where a defect is present on a track, where a record on the defective track is separated into a plurality of parts of displaced so as to keep off the defect, and where the record on the defective track and the next record on a non-defective track (in which records are arranged at normal positions) are successively accessed by the track changeover operation, the distance between the record on the defective track and the next record on the non-defective track in the circumferential direction of the track may become shorter than the distance corresponding to the track changeover time. Accordingly, it may occur that the top of the next record on the non-defective track cannot be accessed immediately after the track changeover operation has been completed, but can be accessed after a magnetic disk having the non-defective track has made one revolution. In this case, there arises a problem that an access time is extended.

SUMMARY OF THE INVENTION

It is an object of the present invention to provide a method for controlling to keep off defects on magnetic disks which method can solve the above problem of the prior art, and can write data in or read data out of the magnetic disks at high speed, to increase the throughput of a data processor.

In order to attain the above object, according to the present invention, the positional information about defects on all of the tracks belonging to one cylinder of a magnetic disk apparatus is recorded in each of the tracks. In other words, when a defect is present at one of the tracks, it is assumed that the defect is present at corresponding positions of the all other tracks, and the same positional information about the defect is recorded in each of the tracks.

In the prior art, each of tracks on a magnetic disk contains positional information about defects on the track, and records are written in the track on the basis of the above defect position information, to keep off the defects. While, according to the present invention, positional information about defects on all of the tracks belonging to one cylinder is recorded in each of the tracks, that is, the same defect position information is recorded in all the tracks, and records are written in each track on the basis of the above defect position information, to keep off the defects. Thus, in a case where a plurality of records having the same length or format are written in each of the tracks, the distance between the top of a track and a record on the track is equal to the distance between the top of another track and the corresponding record on another track. In other words, records are arranged on each track so that adjacent records are spaced apart from each other by a distance corresponding to the track changeover time and all the tracks have the same record arrangement. Accordingly, in a case where one of the tracks belonging to one cylinder is changed over to another track in a write or read operation, it is not required to stop the access to another track for a period when magnetic disks make one revolution, but a record can be written in or read out from another track immediately after the track changeover operation. In other words, a data processor can process data at high speed without taking into consideration defects on the tracks.

According to the present invention, even when defects are present on a plurality of magnetic disks having the same rotating axis, tracks belonging to one cylinder can take the same record arrangement. Hence, in a case where the tracks are to be successively accessed by a channel program having a chain of a plurality of channel command words, a magnetic disk access program which does not require a waiting time in which the magnetic disks make one revolution, and has been prepared without taking the defects into consideration, is applicable to the magnetic disks having the defects, and moreover the performance of a magnetic disk apparatus is not degraded by the defects.

BRIEF DESCRIPTION OF THE DRAWINGS

The above and other objects and advantages of the present invention will become apparent by reference to the following description and accompanying drawings, wherein:

FIG. 1a is a schematic diagram showing the record arrangement on two tracks which belong to one cylinder and have no defects.

FIG. 1b is a schematic diagram showing the record arrangement on two tracks which belong to one cylinder, for a case where one of the tracks has a defect.

DESCRIPTION OF THE PREFERRED EMBODIMENT

Figure 2:
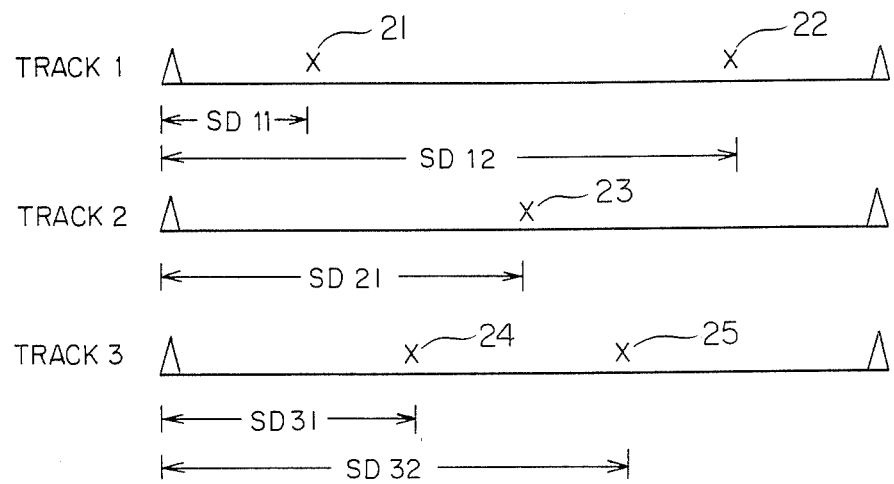
FIG. 2 is a schematic diagram showing how the positions of defects on three tracks are expressed.

Prior to the explanation of the present invention, the difficulties of the prior art will be discussed. FIG. 1a shows how records are written on a pair of non-defective tracks belonging to one cylinder, and FIG. 1b shows that records are written in a defective track so as to keep off a defect.

As shown in FIG. 1a, dummy records are arranged on each of the non-defective tracks at normal positions. Thus, one of the tracks can be changed over to the other track without arising any trouble. In a case where a track has a defect as shown in FIG. 1b, records are written in the defective track so as to jump over the defect. In FIG. 1b, a record is divided into two parts to keep off the defect, by way of example. Thus, the position of a dummy record on the defective track is deviated from the position of a corresponding dummy record on a non-defective track, as shown in FIG. 1b. That is, in FIGS. 1a and 1b, a plurality of logical records having the same length are arranged on each track in such a manner that a dummy record is disposed between adjacent logical records. Referring to FIG. 1a, in a case where tracks 1 and m belonging to one cylinder have no defect, and the (n+1)th logical record on the track m is accessed after the n-th logical record on the track 1 has been accessed, if the length of the dummy record is made accurately correspond to a time necessary for electrically switching one of two write/read heads over to the other head, the (n+1)th logical record on the track m will be accessed immediately after the switchover operation, since dummy records are arranged at normal positions on the two tracks. Thus, when the (n+1)th logical record on the track m is accessed, it is not required to stop the access for a period when the magnetic disks make one revolution. However, in a case where, as shown in FIG. 1b, the track 1 has a defect at a position where the n-th logical record is to be arranged, if the length of the dummy record is made accurately correspond to a time necessary for electrically switching one of two write/read heads over to the other head, the (n+1)th logical record on the non-defective track m will be accessed after the magnetic disks make one revolution. Thus, the access time is extended in a great degree. That is, in a case where dummy records are arranged at normal positions on the tracks ( and m as shown in FIG. 1a, when a time $t_1$ necessary for switching one of two write/read head over to the other head has elapsed, the other head reaches the top of the (n+1)th logical record on the track m, and can read out this logical record. In a case where, as shown in FIG. 1b, the position of a dummy record on the track 1 deviates from the position of a corresponding dummy record on the track m, a disk rotation time $t_2$ corresponding to the distance between the end of the n-th logical record on the track 1 and the top of the (n+1)th logical record on the track m is shorter than the head switchover time $t_1$. Hence, when the switchover time $t_1$ has elasped, the write/read head for the track m reaches the midway in the (n+1)th logical record. Thus, the above head is on standby for a period when magnetic disks make about one revolution, to read out the top of the (n+1)th logical record on the track m.

As mentioned above, in the prior art, it is only intended to keep off a defect on one track, and no regard is paid to the effect of the displacement of record for keeping off the defect, on the track changeover operation.

The present invention is intended to solve the above problem of the prior art. According to the present invention, even in a case where the position of a record on a track of a magnetic disk is deviated from a normal position to keep off a defect, when the track is changed over to another track of a different magnetic disk, a desired record on another track can be accessed immediately after the track changeover operation. That is, a write/read head for the different magnetic disk is not required to be on standby for a period when the magnetic disks make about one revolution.

Now, explanation will be made of the principle and an embodiment of the present invention.

FIG. 2 shows the positions of defects on three tracks belonging to one cylinder. Referring to FIG. 2, a track 1 has defects 21 and 22, a track 2 a defect 23, and a track 3 defects 24 and 25. In the present invention, the distance between the position of a defect on a track and the top of the track is used as defect position information. Accordingly, in a case shown in FIG. 2, symbols SD11, SD12, SD21, SD31 and SD32 are used to indicate the defect position information. Usually, m areas on each track are used for recording defects on the track. When the number of defects on a track is smaller than m, areas which are not used for recording defects, are left as spare areas, and defects which may occur later, are recorded in the spare areas. For example, a home address includes seven areas for recording defects. In actual fact, each track has only one or two defects on the average. Accordingly, superfluous areas are used to record common defect position information according to the present invention.

Figure 3:
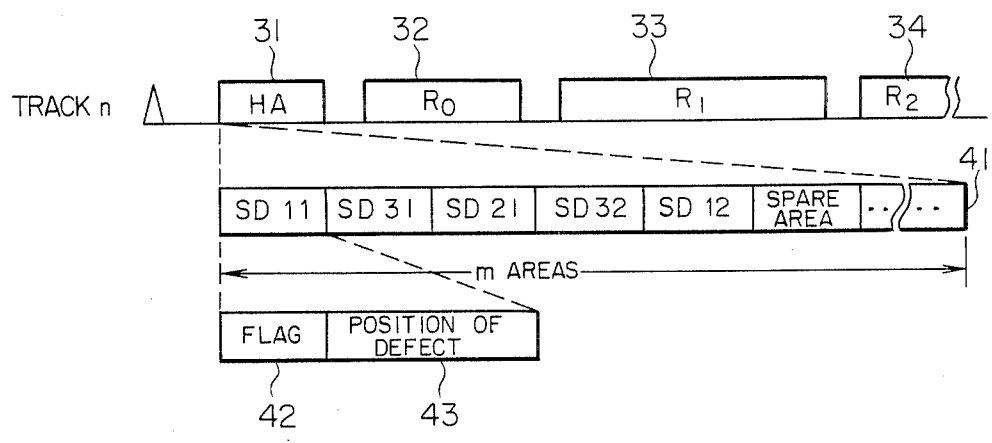
FIG. 3 is a schematic diagram showing that the positional information about defects on all the tracks belonging to one cylinder is recorded in each of the tracks in accordance with the present invention.

FIG. 3 shows defect position information and a pseudo defect flag which are recorded in a track n.

As shown in FIG. 3, a track made up of variable-length records, usually includes a home address 31 and records 32, 33, 34, and so on. The home address 31 stores defect position information 41. It is to be noted that, in FIG. 3, a plurality of pieces $SD_n$ of defect position information for all the tracks belonging to one cylinder are arranged in order of increasing distance, and each piece of defect position information includes a pseudo defect flag 42 for indicating whether or not the defect indicated by the piece of information and the home address are present on the same track. In a case where three tracks belong to one cylinder and five defects are present as shown in FIG. 3, five pieces of defect position information $SD_{11}$, $SD_{12}$, $SD_{21}$, $SD_{31}$ and $SD_{32}$ are recorded in the home address 31 of each of three tracks in order of increasing distance, that is, the pieces of information $SD_{11}$, $SD_{31}$, $SD_{21}$, $SD_{32}$ and $SD_{12}$ are recorded in the order described, and two remaining areas of the home address are left as spare areas. Each piece of defect position information includes the flag 42 and the position 43 of a defect. The flag 42 takes a value "1" when a corresponding defect is present on a track where the flag is recorded, and the flag 42 takes a value "0" when the corresponding defect is present on a track other than the track where the flag is recorded.

In a case where tracks belonging to one cylinder have too many defects to record the defect position information of all the tracks in the home address of each track, a selecting operation is performed in each track on the basis of the information of the flags 42 so that only the positional information about defects which are present on a track having a desired home address 31, is left in the desired home address. The positional information left as above is used in the conventional method for keeping off defects. In usual cases, a large number of defects as mentioned above will not be present on tracks belonging to one cylinder.

Figure 4:
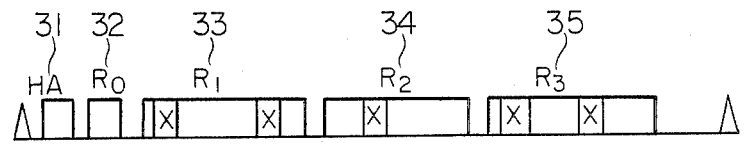
FIG. 4 is a schematic diagram showing an example of a track, in which records are written on the basis of the defect position information shown in FIG. 3.
Figure 5:
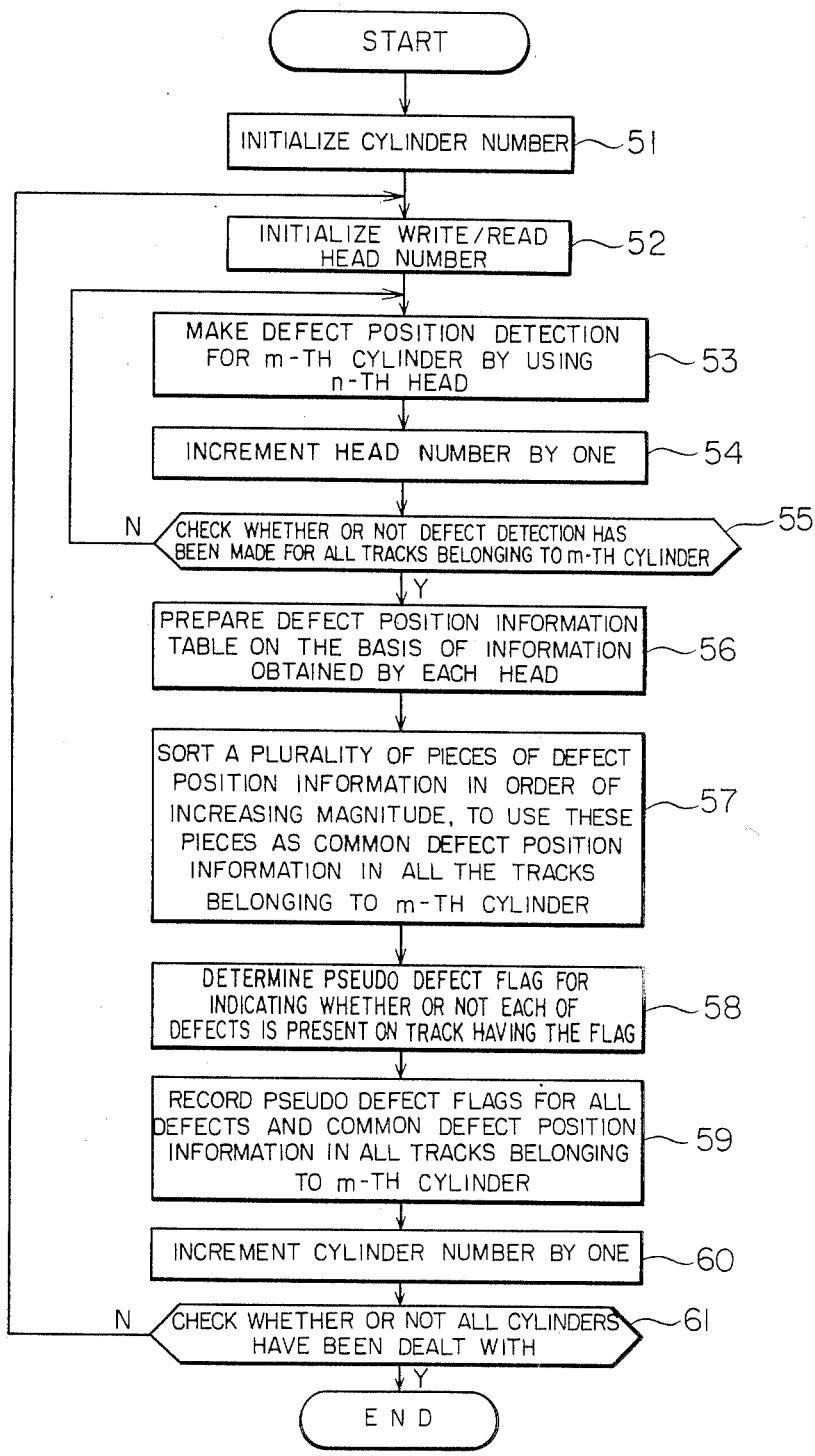
FIG. 5 is a flow chart which shows the processing for recording the same defect position information in all the tracks belonging to one cylinder in accordance with the present invention.

FIG. 4 shows an example of a track, in which records are written on the basis of the above defect position information, and FIG. 5 is a flow chart which shows the processing for recording defect position information in a home address in accordance with the present invention.

The defect position information is usually recorded in the home address in a hard initializing operation which is performed after magnetic disks have been fabricated, or in a soft initializing operation which is performed after a computer system has been constructed, by an initializing processor or the computer system.

Referring to FIG. 5, a cylinder number m and a write/read head number n are initialized, that is, are made equal to zero (steps 51 and 52). Defect detection is made for the m-th cylinder by using the n-th write/read head in the same manner as in the conventional method, in one of the hard and soft initializing operations, to detect a defect on a track and to determine the distance between the defect and the top of the track (step 53). The head number n is incremented by one (step 54). The above defect detection is repeated till the final one of tracks belonging to the m-th cylinder is subjected to the above defect detection (steps 53 to 55). A defect position information table is prepared on the basis of defect position information which is obtained from the m-th cylinder by each write/read head (step 56). A plurality of pieces of defect position information are sorted (or arranged) in order of increasing distance, to use the information pieces thus sorted as the common defect position information in all the tracks belonging the m-th cylinder (step 57). Further, a pseudo defect flag for indicating whether or not each of detected defects is present on a track having the flag, is determined (step 58). The defect flags for the defects on all the tracks belonging to the m-th cylinder are recorded in each of the tracks together with the common defect position information (step 59). The cylinder number m is incremented by one (step 60). The above steps are repeated till the recording of defect information has been made for all the cylinders (step 61).

FIG. 4 shows a track format which is obtained by writing the records 33 to 35 in the track n in a state that the defect position information shown in FIG. 2 has been recorded in the home address 31. It is to be noted the record 32 does not contain ordinary data but contains special information. As mentioned above, according to the present invention, common defect position information is recorded in all the tracks belonging to one cylinder. Accordingly, when a plurality of records having the same length are written in each of the tracks, the distance between the n-th record on one of the tracks and the top of the track is equal to the distance between the n-th record on another track and the top of another track.

Figure 6:
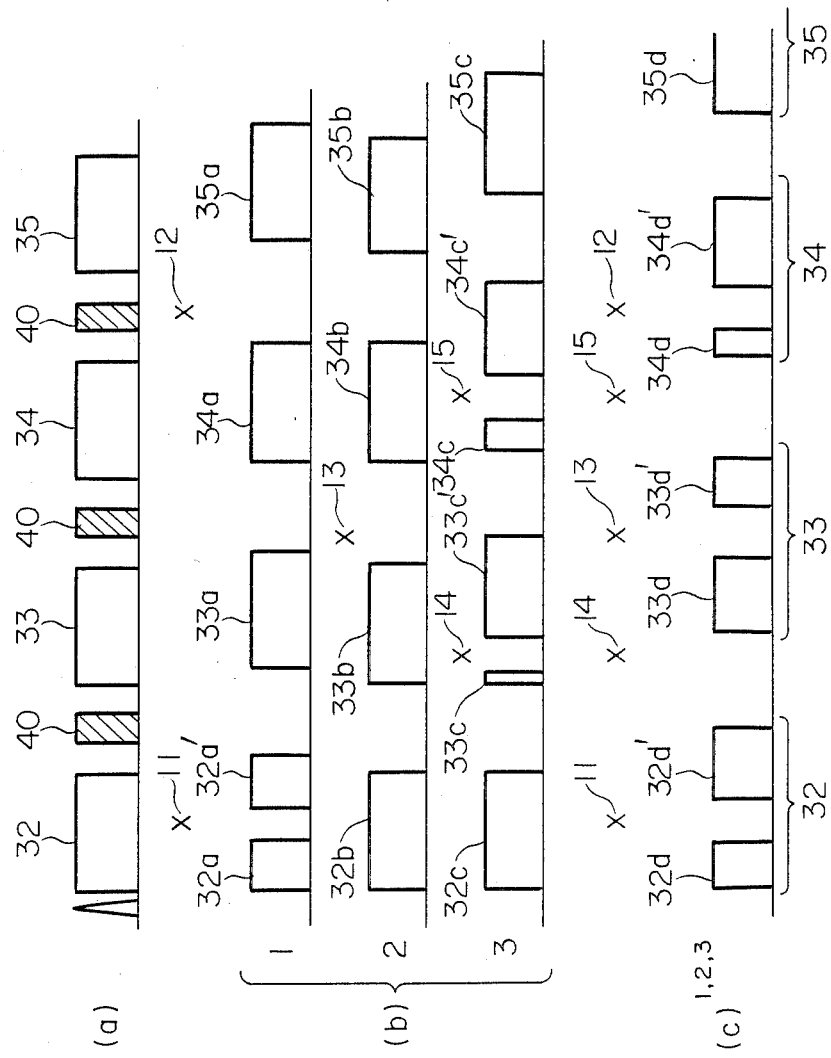
FIG. 6 show schematic diagrams for explaining an embodiment of a record-arrangement control method for keeping off defects on magnetic disks according to the present invention.

In FIG. 6, (a), (b) and (c) are schematic diagrams for explaining an embodiment of a recordarrangement control method for keeping off defects on magnetic disks in accordance with the present invention. In FIG. 6(a) shows the arrangement of records on a nondefective track, (b) shows the arrangement of records on defective tracks for keeping off defects, and (c) shows the arrangement of records on each of the defective tracks for keeping off the defects in accordance with the present invention. The record arrangement of (b) and (c) show record arrangements in comparison with the record arrangement of (a). In (b) and (c) a record is separated into two parts, or the position of a record is deviated from a normal position, to keep off a defect. Referring to (b) according to the conventional method for keeping off defects, three tracks 1, 2 and 3 have different record arrangements. While, according to the present invention, the above tracks have the same record arrangement. That is, taking into consideration all the defects on the tracks 1, 2 and 3, records are arranged on each of these tracks. In FIG. 6, (c) shows one of the tracks 1, 2 and 3 having such a record arrangement.

The present embodiment will be explained below in more detail. As shown in (a) of FIG. 6, in a case where a track has no defect, records 32, 33, 34 and 35 are arranged on the track in this order, when viewed from the top of the track. Further, a dummy record 40 is disposed between adjacent records, to prepare for a track changeover operation. While, in a case where a defect is present on each of the tracks 1, 2 and 3 as shown in (b) of FIG. 6, records are written in these tracks so as to keep off the defect. In more detail, the track 1 has defects 11 and 12, and hence a record corresponding to the record 32 is separated into two parts 32a and 32a' so that the defect 11 is interposed between the parts 32a and 32a'. Owing to the defect 11, records 33a and 34a corresponding to the records 33 and 4 are displaced backward from normal positions. Owing to the defect 11 and the defect 12 which exists at the position of a dummy record, a record 35a corresponding to the record 35 is further displaced from a normal position. The track 2 has only a defect 13. Accordingly, records 32b and 33b corresponding to the records 32 and 33 are arranged at normal positions. However, owing to the defect 13 which exists at the position of a dummy record, records 34b and 35b corresponding to the records 34 and 35 are displaced backward from normal positions. The track 3 has defects 14 and 15. A record 32c corresponding to the record 32 is disposed at a normal position. However, owing to the defect 14, a record corresponding to the record 33 is separated into two part 33c and 33c'. Further, owing to the defect 15, a record corresponding to the record 34 is separated into parts 34c and 34c'. Furthermore, owing to the defects 14 and 15, a record 35c corresponding to the record 35 is displaced backward from a normal position.

According to the present invention, the defects 11 to 15 are recorded in the home address of each of the tracks 1 to 3 in the order of increasing value of the distance between each of the defects 11 to 15 and the top of a track having the defect, together with flags for indicating whether or not each of the defects 11 to 15 and the home address are present on the same track. Accordingly, in an initializing operation, the tracks 1 to 3 are assumed to have the same defects.

Thus, according to the present invention, records are arranged on each of the tracks 1 to 3 as shown in (c) of FIG. 6. That is, a first record corresponding to the record 32 is separated into two parts 32$d$ and 32$d'$ to keep off the defect 11 which will exist in a central portion of the first record, a second record corresponding to the record 33 is separated into two parts 33$d$ and 33$d'$ to keep off the defect 14 which will exist in a head portion of the second record, and the defect 13 which will exist in a central portion of the second record, and a third record corresponding to the record 35 is separated into two parts 34$d$ and 34$d'$ to keep off the defect 15 which will exist in a head portion of the third record, and the defect 12 which will exist in a central portion of the third record. Further, owing to the defects 11 to 15, a record 35$d$ corresponding to the record 35 is displaced backward from a normal position.

As can be seen from the above explanation, the present embodiment can be carried out only by performing a simple initializing operation for magnetic disks, without requiring the reconstruction of conventional hardware.

Further, according to the present invention, in a case where a plurality of tracks are simultaneously subjected to a writing or reading operation by using a plurality of read/write head, it is not necessary to perform different defect keeping off operations for the tracks, and the capacity of a buffer for synchronizing data on a track with data on another track can be determined without taking into consideration the correction caused by jumping over a defect.

Further, in a case where a defect is produced on a track in a period when magnetic disks are operated, the record in an area having the defect is written in a spare area by a soft initializing operation. However, in a case where all of spare areas have been already used, it is impossible to carry out the above processing. In this case, the pseudo defects flags on the track where the defect is produced, is checked, and the above record is written in an area occupied by one of the above flags which indicates a defect on a different track. Thus, it is not required to replace a magnetic disk where the defect is produced, by a new magnetic disk.

I claim:

1. A method for controlling to keep off defects usable in a magnetic disk apparatus, in which a plurality of magnetic disks are included and defect position information is recorded in each of tracks on each magnetic disk to keep off a defect in writing records in each track, said method comprising the steps of:
    recording the positional information about defects on all the tracks belonging to a cylinder of the magnetic disk apparatus, in each of the tracks; and
    writing records in each of the tracks, while keeping off said defects on the basis of the positional information about said defects.

* * * * *

UNITED STATES PATENT AND TRADEMARK OFFICE
CERTIFICATE OF CORRECTION

PATENT NO. : 4,805,048
DATED : Feb. 14, 1989
INVENTOR(S) : TAKEUCHI et al.

It is certified that error appears in the above-identified patent and that said Letters Patent is hereby corrected as shown below:

IN THE DRAWINGS:

FIG. 1b, TRACK $\ell$ and TRACK m, delete:

"(n-1)TH LOGICAL RECORD" and insert --(n+1)TH LOGICAL RECORD--

Signed and Sealed this

Twenty-first Day of August, 1990

Attest:

HARRY F. MANBECK, JR.

Attesting Officer

Commissioner of Patents and Trademarks